March 1, 1960 E. G. RAGATZ 2,926,754
METHOD FOR IMPROVED MECHANICAL EFFECTIVENESS
AND EFFICIENCY OF COMPONENT INTERCHANGE
ON A VAPOR LIQUID CONTACTING TRAY
Filed Feb. 29, 1956 3 Sheets-Sheet 2
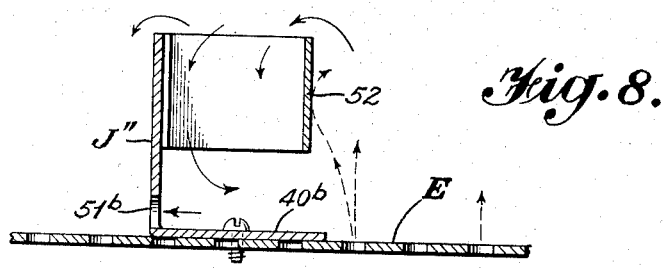
Fig. 8.
Fig. 7.
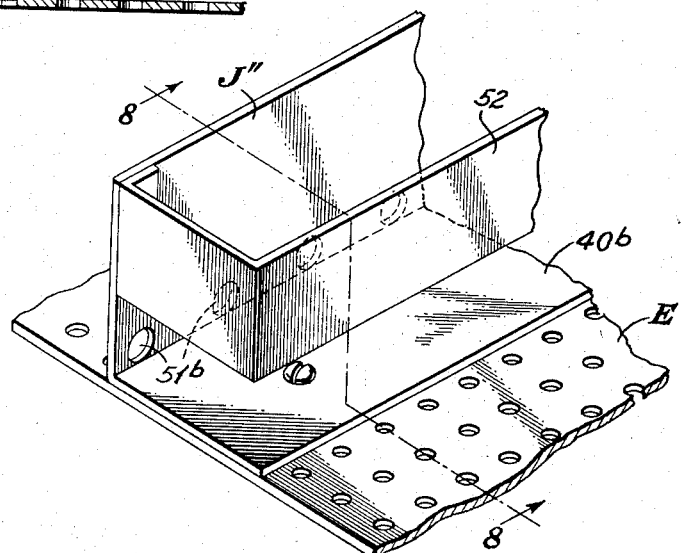
Fig. 6.
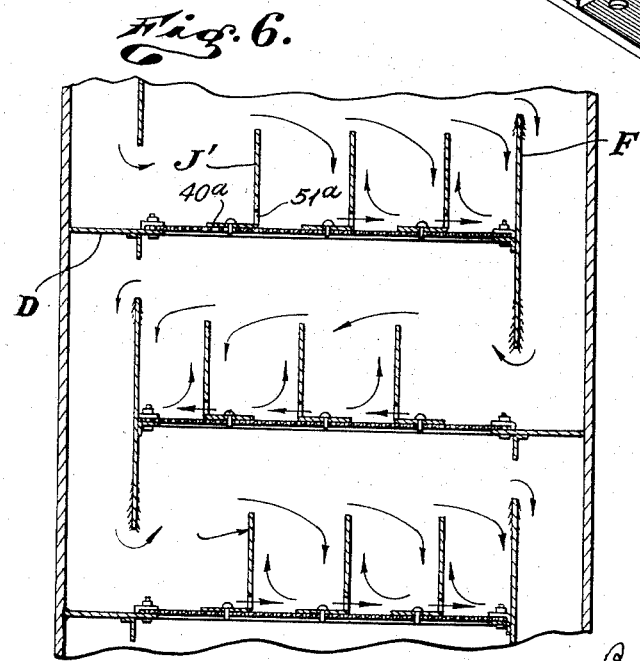
INVENTOR.
Edward G. Ragatz
BY
Burns, Doane, Benedict & Irons
Attorneys

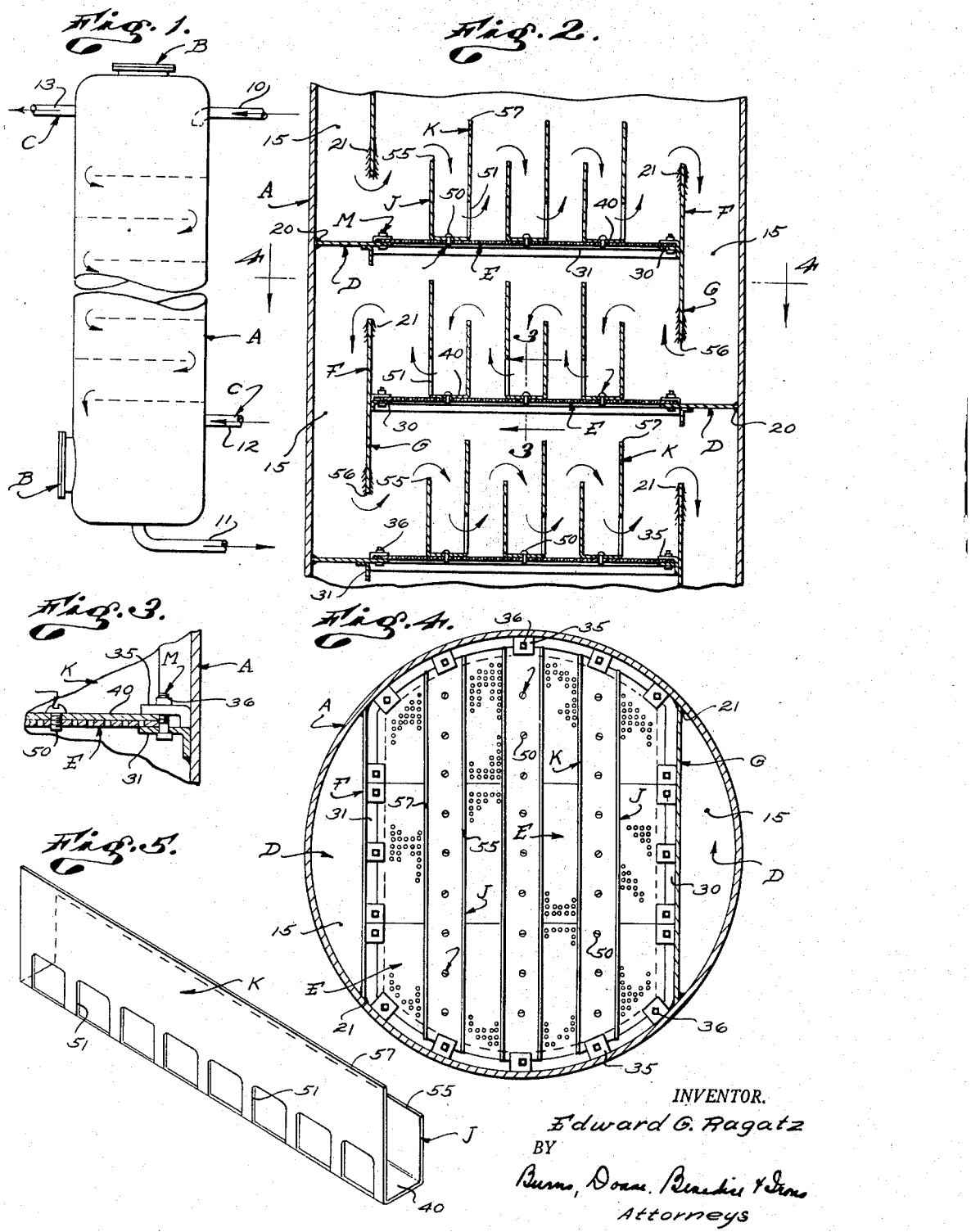

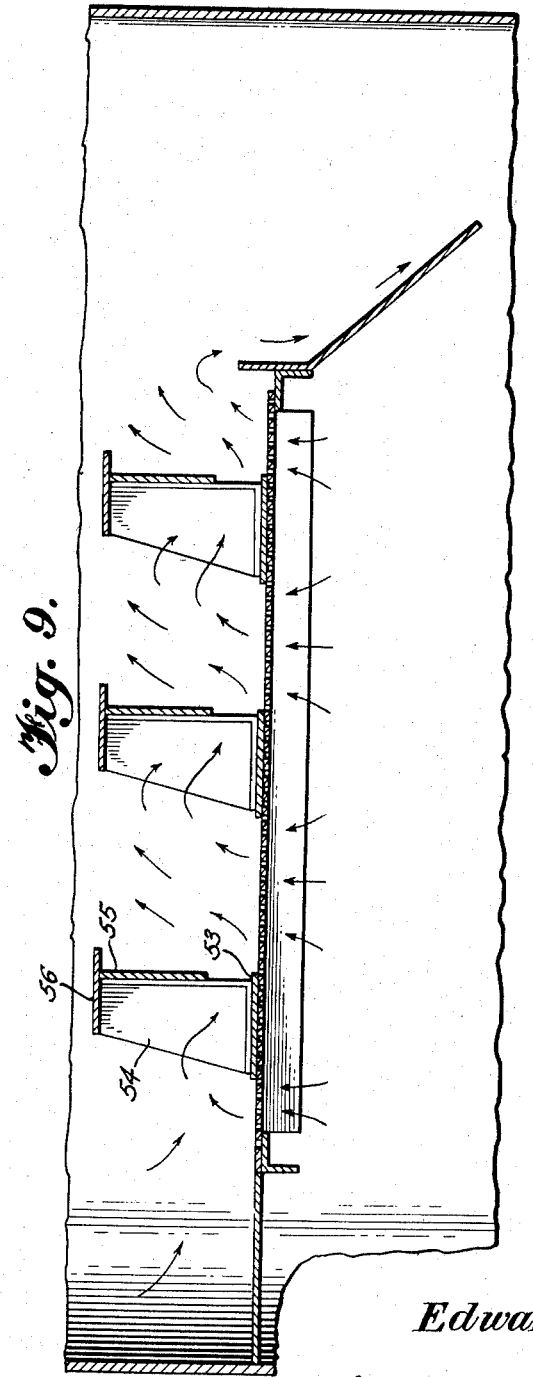

2,926,754

METHOD FOR IMPROVED MECHANICAL EFFECTIVENESS AND EFFICIENCY OF COMPONENT INTERCHANGE ON A VAPOR LIQUID CONTACTING TRAY

Edward G. Ragatz, San Marino, Calif., assignor to Edw. G. Ragatz Co., San Marino, Calif., a partnership Application February 29, 1956, Serial No. 568,566

2 Claims. (Cl. 183—121)

This invention relates to a method for reducing the hydraulic heads required to effect liquid crossflow, and for increasing the efficiency of component interchange, on individual horizontal vapor-liquid contacting trays employed in a vertically-stacked multiple-tray column. It is more specifically concerned with improving the liquor-crossflow effectiveness and component-interchange efficiency of perforated-plate and similar type "bottom-entry" trays.

This application is a continuation-in-part of my co-pending application Serial No. 457,917, filed September 23, 1954, now abandoned, which is a continuation-in-part of my copending application Serial No. 312,933, filed October 3, 1952, now United States Patent 2,713,478, and of Serial No. 255,807, filed November 10, 1951, now abandoned, and Serial No. 236,742, filed July 14, 1951, now United States Patent 2,693,350.

Columns such as are used in handling fluids for distillation or absorption are commonly constructed with trays designed to conduct liquids in a zig-zag course downwardly through the column while admitting gases upwardly into horizontal-flowing portions of the liquid for intimate counter-current contacting therewith.

It is a broad objective of the present invention to utilize the velocity energy of the ascending vapor-stream to assist the flow of liquid across an "unstepped" level tray, particularly one of large diameter. This effect is attained by developing a multiplicity of relatively small hydraulic pressure gradients at spaced intervals across the tray. This action I broadly refer to hereinafter as the "multiple-gradient" effect.

Another objective of this invention is to increase the tray efficiency by utilizing the velocity energy of the ascending vapor-stream to more effectively agitate the liquid during its passage across the tray, and to increase the residence time of the liquid on the tray for a given tray loading. This effect is attained by providing a plurality of relatively deep vapor-liquid contacting zones alternating with a plurality of coalescing zones across the tray, wherein the upwardly rising vapors are first passed in parallel streams through zones of substantially lesser cross-section than the tray to form initial vapor-liquid contacting zones of substantial depth and extremely high turbulence, and from which they are then passed into a single overlying contact zone of substantially lower velocity and turbulence. This action I broadly refer to hereinafter as the "high-turbulence" effect.

As a further objective, my invention relates to a method of increasing the liquid residence-time on the tray by providing a plurality of alternating vapor-liquid contacting zones and liquid-coalescing zones across the tray, and recirculating a portion of the coalesced liquid from a coalescing zone to an adjacent upstream contacting zone. This action I broadly refer to hereinafter as the "recirculation" effect.

These varied objectives of my basic invention are generally accomplished by the following combination of tray operations:

(1) Providing a plurality of alternate elongate vapor-liquid contacting zones and liquid-coalescing zones on a single column tray.

(2) Passing the down-flowing column liquid in a relatively shallow stream across said alternate zones.

(3) Introducing the uprising vapors as a plurality of parallel streams into the bottoms of said alternate contacting zones at relatively high velocity and then passing said vapors directly and without reversal of flow through an overlying contacting zone at reduced velocity, disengaging the vapors from the liquid in said overlying contacting zone at said reduced velocity, and dividing the disengaged vapors into a plurality of parallel streams for introduction into the next overlying tray.

(4) Passing frothy liquid from the upper sections of said alternate vapor-liquid contacting zones into adjacent liquid-coalescing zones on the same tray.

(5) Passing coalesced liquid from said coalescing zones into relatively lower sections of adjacent vapor-liquid contacting zones on the same tray.

In a broad embodiment, this invention comprises a method of improving the mechanical effectiveness and the efficiency of component interchange on an individual horizontal vapor-liquid contacting tray employed in a vertically-stacked multiple-tray column, comprising introducing liquid onto said tray, flowing the liquid in a shallow stream through multiple elongate vapor-liquid contacting zones on said tray, introducing vapors below said tray, passing said vapors in a plurality of parallel streams, each comprising a multiplicity of small vapor-jets or the like, upwardly into said contacting zones, passing said vapors through the lower portion of said contacting zones at relatively high velocity thereby establishing bodies of frothy liquid under high turbulence in said zone portions, passing the vapors directly from said bodies of frothy liquid upwardly and without reversal of flow into an overlying contacting zone of relatively lower velocity, disengaging the vapors from the liquid in last said zone at said lower velocity to form a single continuous stream of uprising vapors, separating said single stream into a plurality of parallel streams for introduction into the next overlying tray, diverting frothy liquid from an upper portion of said frothy bodies into adjacent elongate vapor-disengaging zones lying parallel to said vapor-liquid contacting zones, coalescing the frothy liquid in said coalescing zones, and introducing said coalesced liquid from last said zones into relatively lower sections of the bodies of frothy liquid in adjacent contacting zones on said tray.

In a more specific embodiment, the coalesced liquid is passed into the bottom section of the frothy liquid of an adjacent downstream contacting zone.

In another specific embodiment, coalesced liquid is returned to the bottom section of the frothy liquid in the adjacent upstream contacting zone.

In a further embodiment, a portion of the coalesced liquid is returned to the bottom section of the adjacent upstream frothy liquid and a portion of the coalesced liquid is passed to the bottom section of the adjacent downstream frothy liquid.

In order to flow liquid across a column-tray in a shallow horizontal stream, a hydraulic pressure-gradient must be developed between the liquid onflow and off-flow sides of the tray. In the larger diameter columns (normally over 8–10 feet) the magnitude of this hydraulic gradient often requires stepping or sloping of the conventional tray structure to avoid shorting of liquid through the tray and/or serious maldistribution of the upflowing vapor-stream across the tray.

By employing the "multiple-gradient" effect of my invention, the column-liquid can be induced to flow across a substantially horizontal tray without resort to stepping or sloping of the tray structure, and without maldistribution of the upflowing vapor stream. This effect is attained by combining the "hydraulic heads" developed in the plurality of coalescing sections across the tray with the "gas lift" effects developed in the adjacent downstream contacting zone to form a plurality of successive small liquid-gradients which serve to transfer the column-liquid across the tray "zone by zone."

In column operations where the flowing volumetric ratios of liquids-to-vapors are large and/or component interchange difficult to effect (as in natural gasoline absorbers) extreme turbulences must be attained within the vapor-liquid contacting zones for attainment of maximum efficiency of component interchange. In the conventional column tray, however, attainment of such turbulences by employment of appropriately high vapor velocities is prevented by the need to hold down the velocity-of-emergence of the vapors from the upper surface of the main body of contacted liquid to avoid excessive entrainment of liquid in the disengaged vapor stream.

By employing the "high-turbulence" effect of my invention in which the main vapor-stream is initially introduced into a plurality of contacting zones of lesser cross-section and corresponding higher velocity, the resultant zonal turbulences-of-contact can be increased to the extent needed for attainment of highly efficient component interchange. At the same time, the excessive liquid entrainment which would accompany such high vapor velocities in the conventional tray is suppressed by flowing a "blanket" of additional frothy liquid across the tray above both contacting and coalescing zones. Under these circumstances, the high-velocity vapors carrying frothy liquid upwardly from the high-turbulence lower-portions of the multiple contacting zones encounter the overlying blanket of cross-flowing liquid, and have their velocity reduced sufficiently therein so that as they leave the upper surface of the blanket as a combined stream, they no longer carry with them an inordinate amount of entrained liquid.

"Residence-time" on the part of the cross-flowing tray-liquid is also important to the attainment of high component-interchange efficiencies. In certain operations, it may be found advisable to compensate for reduced contact-zone turbulence by providing added liquid residence-times obtained by employing the "recycle" effect of my invention in which a portion of the coalesced liquid from the coalescing zone is recycled backward into the adjacent upstream contacting zone. This operation will usually be employed when the flowing volumetric ratios of oil-to-vapors are such that substantially all the cross-flowing liquid flows through the coalescing zones, and the volume of upflowing vapors is relatively high, as in the case of employing chilled oil in a high-pressure absorption operation.

It should be noted that the "multiple-gradient" tray action is normally the principal objective in operations involving relatively-low flowing volumetric ratios of liquid-to-gas and relatively large diameter columns, while the "high-turbulence" tray action is normally employed in operations involving relatively-high flowing volumetric ratios of liquid-to-gas and smaller diameter columns. The dividing lines between "large" and "small" column diameters are generally in the region of 8–10 feet. It should also be recognized that a multiple-gradient effect of varying degree is also attained with the high-turbulence type of operation.

The objectives above set forth may be carried out with my method in a variety of different kinds of apparatus. Certain suitable apparatus for carrying out the method is illustrated in the accompanying drawings.

Figure 1 is a schematic view of a tray column showing the usual vertical tubular body with normal manhole fittings and vapor and liquid handling ducts, and diagrammatically indicating the location of horizontal vapor-liquid contacting trays therein.

Figure 2 is a vertical elevation in section showing a tray structure particularly adapted to obtain the multiple-gradient and high-turbulence effects of my invention.

Figure 3 is a sectional view taken along the line 3—3 of Figure 2.

Figure 4 is a plan section taken along the line 4—4 of Figure 2.

Figure 5 is a perspective view of a weir, blanking plate and baffle structure forming a unit which may be suitably anchored in the tray illustrated in Figure 2.

Figure 6 is a sectional elevation of a tray structure particularly suitable for obtaining the recirculation effect of my invention.

Figure 7 is a modification of the device shown in Figure 6 which may be used for attaining both the high turbulence and recirculation effects of my invention.

Figure 8 is an elevation section taken along line 6—6 of Figure 7.

Figure 9 is a sectional view of another form of apparatus which may be used to obtain both the recirculation and multiple gradient effects.

The present invention, when employing any of the structures illustrated herein, is adapted to be carried out in connection with or as a part of a column, such as that diagrammatically shown in Figure 1. The column generally involves a vertically disposed tubular body A provided with suitable manhole fittings B and various ducts C. The particular arrangement of ducts illustrated show a liquid inlet 10 at the top of the column, a liquid outlet 11 at the bottom, a gas inlet 12 in the lower portion of the body and a gas outlet 13 at the upper portion of the body.

It is to be understood that the body A will in practice be provided with other connections, fittings or accessories, as circumstances require. A plurality of trays are provided in the body A and are vertically spaced one above the other, as illustrated by the dotted lines. The trays are arranged so that liquid introduced into the upper portions of the body follows a zig-zag course as it descends, as indicated by the arrows in Figure 1.

A form of apparatus upon which this invention may be practiced for obtaining both the "multiple-gradient" and "high-turbulence" effect is illustrated in Figures 2 to 5. In this embodiment there is provided a tray construction involving generally a horizontally disposed plate having a liquid-receiving portion D located adjacent one side of the body and a main or perforated portion E extending from D toward the opposite side of the body but terminating short thereof. An overflow weir F projects upwardly from the terminal edge of the main plate portion E and an apron G depends from the weir and below the plate. The weir F and apron G cooperate with the wall of the body A at the side opposite the liquid-receiving portion D to define a passageway 15 through which liquid overflowing weir F is discharged onto the liquid-receiving portion of the next underlying tray.

In the particular construction illustrated, a plate-supporting flange 30 projects from the weir F at the level of plate D and extensions or continuations 31 of flange 30 extend around the inside of the wall of the body A from the weir F to plate portion D. The perforate section E of the plate extends from the liquid-receiving plate D to the weir F and, as illustrated, rests upon and is supported by the flanges 30 and 31.

A fastening means M serves to releasably secure plate E to the flanges and a plurality of these are suitably located at spaced intervals as illustrated in Figure 4. Each unit of the clamping means M is shown as comprising a clamp 35 and a screw fastener 36 which when tightened serves to hold the plate E securely in position. Any other suitable fastening means may be used.

A plurality of weirs and baffles are located so as to overlie the main or perforate portion of the plate E lying between the liquid-receiving plate D and the overflow weir F. As illustrated, the weirs designated J and the baffles K check horizontal flow of liquid across the plate.

The weirs J and baffles K alternate and are spaced apart by blanking strip 40 so as to provide what I choose to call a baffle-unit.

The baffle units are spaced apart as illustrated in Figure 2. These particular baffle-units are elongate, horizontal elements lying transverse the flow of crossflowing liquid and having their ends supported from the wall of the body A.

One suitable structure for the baffle-unit is illustrated in Figure 5. As illustrated, the weir J and the adjacent downstream baffle K, as well as the blanking strip 40, are made from a single metal sheet to form a U-shaped elongate unit. This unit is of such dimensions that it can be easily passed through a manhole provided in the body A of the column. When in place, this unit is supported at its ends by the flanges 31 projecting inwardly from the wall of the column. The units are preferably held in place by fastening means M which serve to clamp the ends of the baffle-units and the peripheral portions of plate E to the flanges as illustrated in Figures 3 and 4 of the drawings.

As illustrated, the portions of the plate E underlying the blanking strip 40 are perforated. This portion could be solid, or alternatively might be an imperforate section of the tray to which the weir and baffle might be secured. The portion of the plate lying between the spaced baffle-units is perforated or foraminous as is shown in Figures 2 and 4 so that gas flowing upwardly in the column A is passed into the tray as a plurality of parallel streams each of which is broken into a multiplicity of jets of vapor which are introduced into the liquid flowing across the tray. The check baffles K in the embodiment illustrated are provided with a plurality of ports 51 adjacent the blanking strip 40, whereas the weirs J are imperforate as illustrated.

When the apparatus of Figures 2 to 5 is employed primarily for attainment of the "multiple-gradient" effect, normally all of the liquid flows across the tray in an undulating path as illustrated by the arrows in Figure 2. In following this path across the tray, the entering liquid-stream flows from a receiving plate D onto the first of a plurality of "free" perforate sections of plate E, where it is converted into a frothy-body by turbulent contacting with jetting vapors from the first of a plurality of parallel vapor-streams being introduced into a plurality of contacting zones defined by said "free" perforate sections.

After turbulent contacting with the cross-flowing liquid in the first contacting zone, the first portion of the upflowing vapor-stream separates from the frothy-liquid body at a point generally above the first contacting zone and enters a zone of relatively lower velocity where it joins with vapors similarly separated from the other tray contacting zones. The combined stream of vapors then passes upwardly, without reversal or direction, through the last mentioned zone to the underside of the next overlying tray where it is again divided into a plurality of parallel streams for introduction into the separate contacting zones of said overlying tray.

The cross-flowing liquid from which the aforementioned vapors have been separated flows in frothy form from an upper portion of the first frothy-body over the first weir J into a liquid-coalescing zone defined by weir J, baffle K, and blanking plate 40, where it is coalesced. The coalesced liquid then flows through the ports 51 in baffle K into the bottom portion of the next frothy-liquid body created by the next parallel vapor-stream in the adjacent (second) downstream contacting zone. The upwardly rising vapors separate from the frothy liquid in the second contacting zone and combine with the vapors separated from the other contacting zones, while the frothy liquid from the second contacting zone flows into the second coalescing zone, all as previously described. This coalescing and refrothing of the liquid-stream crossing the tray is repeated a plurality of times, the number depending on the number of alternating zones provided for any given tray.

The frothy liquid-stream from the last contacting zone flows over the weir F and downwardly through the passage 15 onto the underlying liquid receiving plate D from whence it flows onto the next underlying tray where the said frothing, coalescing and refrothing steps are repeated. The cross-flowing liquid on any particular tray always flows in the opposite direction across the column from the direction it took on the overlying tray from whence it came.

In the preferred relationship of parts for obtaining the multiple-gradient effect with the apparatus of Figures 2 to 5, the upper edges 57 of the baffles K are positioned well above the upper edges 55 of the weirs J so that substantially all of the cross-flowing liquid is caused to flow "up and over" the edges 55 of the weirs J, and "down and through" the ports 51 of the baffles K, this following the undulating path indicated by the arrows in Figure 2.

When it is desired to develop the high-turbulence effect of my invention with apparatus of the character of Figures 2–5, the edges 57 of the baffles K will be positioned relatively lower than above described, or even set level with the edges 55 of weirs J, whereby a portion of the cross-flowing liquid stream is caused to flow in a continuous path over both contacting and coalescing zones to provide an overlying "blanket" of liquid for suppression of liquid-entrainment in the upflowing vapors as previously described. Under these circumstances, the baffle-units will normally be spaced closer together, and much higher vapor velocities attained through the lower "confined" portions of the contacting zones, than with the simple multiple-gradient effect tray. At the same time, a multiple-gradient effect of varying degrees will still be obtained from that portion of the cross-flowing liquid stream which flows through the ports 51 of baffle K.

The "recycle" effect of my method can be obtained with a tray structure such as that shown in Figure 6. With this structure, the liquid-receiving plate, perforate plate, off-flow weir, and depending apron, may be substantially identical with those shown in Figure 2. Also, the mode of securing the various elements in the column may likewise be the same, and hence further description of these items is unnecessary. In practicing the invention on the apparatus shown in Figure 6, weirs J' are provided with ports 51$^a$ adjacent to blanking plate 40$^a$ and are positioned on the downstream edge of the blanking plate in contrast to the position of weirs J on the upstream edge of the blanking plate in the embodiment shown in Figure 2. The cross-flowing liquid is passed along the path substantially as shown by the arrows in Figure 6. The liquid-stream from an overlying tray is passed from liquid-receiving plate D into a zone of agitation contact wherein the first of a plurality of parallel streams of vapor is introduced, thus forming the first contacting zone. Some of the frothy liquid coalesces in the zone formed by weir J' and blanking plate 40$^a$. A portion of this liquid flows back into the lower portion of the first contacting zone, while the remaining portion flows forward into the bottom portion of the adjacent downstream contacting zone through ports 51$^a$ and is refrothed therein. The remaining portion of the frothy liquid from the first contacting zone flows over the weir J' and into the adjacent downstream contacting zone. This action is repeated in the various downstream zones until the liquid reaches the final contacting zone, after which the frothy liquid overflows the off-flow weir F and is conducted to the next underlying tray.

The coalesced liquid which passes through the ports 51$^a$ will carry with it any non-miscible liquids, such as water, which is sometimes present and which otherwise might be trapped in the angle formed by the weir and the blanking plate. In this way there is no excessive accumulation of water or the like on the trays during the operation. The proportion of total coalesced liquid which is passed through ports 51ᵃ may be varied within limits by varying the size of said ports.

A high turbulence effect in combination with the recycle effect can be obtained by employing a device such as shown in Figures 7 and 8. In this device the perforate plate E, the imperforate plate 40ᵇ, the weir J″ and the ports 51ᵇ may be substantially as described in the foregoing description of Figure 6. In addition, mounted on or in conjunction with weir J″ is a vapor-deflecting baffle 52. This element is shown as mounted directly on the baffle J″, but could be supported in any other suitable manner. Uprising vapors are introduced into the several contacting zones in parallel streams all as previously described, but in contrast to the operation effected with the structure of Figure 6, are confined in the lower portion of the contacting zones of Figures 7 and 8, to paths of high velocity by the deflecting action of baffles 52.

The cross-flowing liquid follows the paths indicated by the arrows in Figure 8. Frothy-liquid circulating through the lower section of the contacting zones is restrained from entering the coalescing zones formed by baffles 52, weirs J and blanking plates 40ᵇ, until it clears the upper edges of baffles 52, after which it joins the main frothy stream of cross-flowing liquid. A portion of the combined frothy-liquid is coalesced in the adjacent downstream coalescing zone, from which a portion of coalesced liquid is recycled to adjacent up-stream, and a portion passed through ports 51ᵇ into the lower portion of the adjacent downstream contacting zones. The balance of the combined frothy-liquid stream passes entirely over the baffle J″ into the upper section of the next adjacent downstream contacting zone.

As a result of the confining action of the deflecting baffle 52, the vapors and liquid are confined to a relatively narrow passageway in the power portion of the contacting zones wherein high turbulence is developed. Since a portion of the frothy-liquid overflows the weir J', there is also developed a blanket of frothy-liquid overlying the several high-turbulence contacting zones, and this blanket serves the function previously described in the high-turbulence embodiment whereby the velocity of the vapors leaving the upper surface of the overlying liquid blanket are sufficiently reduced so that undue entrainment of liquid into the next overlying tray is prevented.

As in the case of the embodiment shown in Figure 6, recirculation of a portion of the coalesced liquid occurs. However, the degree of recirculation attained by employment of deflecting-baffle 52 may be modified to any degree desired by adjusting the relative size of the ports 51ᵇ and the clearance beneath baffle 52 and blanking plate 40 to permit any proportion desired of coalesced liquid to pass into the lower portions of the adjacent downstream contacting zones. As a result of this method of tray operation, the efficiency of the tray is materially increased in that (1) through alternate liquid agitation and coalescence a maximum of fresh liquid surfaces are brought into component-interchange contact with the rising vapor stream, (2) turbulences approaching the optimum may be attained in the contacting zones without an accompanying excessive entrainment of liquid into the overlying trays, and (3) recirculation of coalesced liquid can be adjusted for attainment of optimum residence time and maximum tray efficiency.

The baffle device of Figure 9 is designed to overcome the liquid-shorting difficulties associated with simple high-vacuum perforated-plate trays of large diameter. As with the previously described tray structures, narrow elongated baffle strips are interposed over the perforated-plate proper transverse to the flow of liquid across the tray, with said strips alternating with areas of open perforated sections. In Figure 9 such a strip 53 supports a series of vertical gusset plates 54 carrying vertical baffles 55 paralleling the downstream edge of plate 53. The lower edges of these baffles are elevated above plate 53 sufficient to allow free-flow of the cross-flowing liquid beneath them, and are of sufficient height to prevent back-flowing of frothy liquid from a downstream agitation zone into an upstream coalescing zone formed by the cooperative action of plate 53 and baffle 55. Gusset plate 54 also carries a horizontal vapor-deflecting plate 56, which plate may be substantially the same width as blanking plate 53, but with its downstream edge positioned substantially ahead of the downstream edge of baffle 53. Through the vapor-deflecting action of plate 56, disengaged vapors from the agitation sections are restrained from agitating the liquid in the coalescing zone defined by blanking stripping 53, the rear portion of plate 56, vertical baffle 55, and plate 56, thereby increasing the coalescing effectiveness of said zone. At the same time, the "offset" positioning of plate 56 with plate 53 directs the uprising vapors in a forward-slanting flow, which slant develops a "forward" energy component which tends to move the liquid froth forward across the tray structure.

Some degree of recycling of coalesced liquid back into the preceding agitation zone occurs. However, this is reduced by the fact that the off-flow weir will normally be much lower than weirs of other embodiments shown herein due to the need for holding the overall tray pressure-drop along the path of liquid-flow across the plate to an absolute minimum, while the velocity of the "forward inclined" vapor stream is sufficient to form a substantial "pressure vector" tending to hold the coalesced liquid onto the coalescing-section base.

With the baffle arrangement of Figure 9, the single relatively-large pressure "flow-gradient" of the simple perforated plate tray is reduced to a number of smaller gradients operating over shorter spans of perforated-plate section, thereby materially reducing the magnitude of the differential pressure-drops developed across the tray.

The invention has been described in connection with a number of modifications but it should not be interpreted as limited strictly to the embodiments shown.

I claim as my invention:

1. A method of improving the mechanical effectiveness and efficiency of component interchange on an individual horizontal vapor-liquid contacting tray employed in a vertically-stacked, multiple-tray column comprising introducing liquid on to said tray, flowing the liquid across said tray over transverse multiple, parallel, elongate, spaced-apart, initial vapor-liquid contacting zones of high vapor velocity and turbulence on said tray, successive initial contacting zones being separated by a vapor disengaging zone, said initial contacting zones having a combined cross-sectional area substantially less than that of an immediately overlying zone of substantially reduced vapor velocity and turbulence with which they communicate, introducing vapors into said initial contacting zones from below the tray as a multiplicity of small, upwardly-directed, high velocity jets, each initial contacting zone comprising a multiplicity of said jets distributed throughout the bottom portion of the zone, each of which initial contacting zones being large in comparison to the sum total of the jets therein, thereby forming a plurality of parallel high velocity streams of upwardly rising vapors, each stream consisting of the combined vapors jetted into that zone, said vapor streams being spaced apart and isolated from each other as they pass into said immediately overlying zone, contacting said liquid with said jets in said initial contacting zones thereby forming a plurality of parallel bodies of frothy liquid under high turbulence, combining the vapor-streams of all said initial contacting zones to form a single stream of upwardly rising vapor in said overlying zone of substantially reduced vapor velocity and turbulence and thereafter passing the thus combined vapors to the next overlying tray, diverting a portion of said frothy liquid from each of said contacting zones into an adjacent elongate vapor-disengaging zone into which no vapors are jetted directly from below the tray, thereby establishing a zone of reduced turbulence in the lower portion of said disengaging zone adjacent the floor of the tray, said disengaging zone lying parallel to and being interposed between said initial contacting zones to isolate the jetting vapor streams passing therethrough from one another, coalescing frothy liquid in said vapor-disengaging zone, collecting the coalesced liquid on the tray-deck and flowing all of the thus collected liquid as a stream into the bottom sections of a body of frothy liquid in an adjacent contacting zone on said tray.

2. The method of claim 1 wherein frothy liquid is withdrawn from the upper section of the vapor-liquid contacting zone into a disengaging zone.

References Cited in the file of this patent

UNITED STATES PATENTS

| | | |
|---|---|---|
| 1,811,247 | Smith | June 23, 1931 |
| 2,085,522 | Baars | June 29, 1937 |
| 2,116,933 | Ragatz | May 10, 1938 |
| 2,678,201 | Koch | May 11, 1954 |
| 2,693,350 | Ragatz | Nov. 2, 1954 |
| 2,693,949 | Huggins | Nov. 9, 1954 |
| 2,713,478 | Ragatz | July 19, 1955 |

FOREIGN PATENTS

| | | |
|---|---|---|
| 569,039 | Great Britain | May 2, 1945 |